United States Patent
Yamamoto

(10) Patent No.: US 6,444,610 B1
(45) Date of Patent: Sep. 3, 2002

(54) EXHAUST GAS PURIFYING CATALYST

(75) Inventor: Shinji Yamamoto, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 148 days.

(21) Appl. No.: 09/617,490

(22) Filed: Jul. 14, 2000

(30) Foreign Application Priority Data

Jul. 15, 1999 (JP) .......................................... 11-201475
Jul. 11, 2000 (JP) ........................................ 2000-210589

(51) Int. Cl.$^7$ ........................... B01J 23/00; B01J 23/40; B01J 23/58; B01J 23/56; B01J 23/44
(52) U.S. Cl. ..................... 502/325; 502/326; 502/327; 502/328; 502/330; 502/332; 502/333; 502/334; 502/339; 502/303; 502/304; 502/439; 502/527.12; 502/527.11; 502/527.18; 502/527.19; 502/63; 502/66; 502/73; 502/74
(58) Field of Search ................................ 502/325, 326, 502/327, 328, 330, 332, 333, 334, 339, 303, 304, 439, 527.12, 527.11, 527.18, 527.19, 63, 66, 73, 74; 423/213.5, 239.2

(56) References Cited

U.S. PATENT DOCUMENTS

| | | | | |
|---|---|---|---|---|
| 4,335,023 A | * | 6/1982 | Dettling et al. | 252/466 PT |
| 4,727,052 A | | 2/1988 | Wan et al. | 502/327 |
| 5,147,842 A | | 9/1992 | Funabiki et al. | 502/304 |
| 5,200,384 A | | 4/1993 | Funabiki et al. | 502/304 |
| 5,395,600 A | * | 3/1995 | Cornelison | 422/180 |
| 5,714,228 A | | 2/1998 | Beckmeyer et al. | 428/118 |
| 5,772,972 A | | 6/1998 | Hepburn et al. | 423/213.5 |
| 5,884,473 A | * | 3/1999 | Noda et al. | 60/274 |
| 5,894,013 A | * | 4/1999 | Takada | 422/177 |
| 6,047,544 A | | 4/2000 | Yamamoto et al. | 60/285 |
| 6,149,877 A | * | 11/2000 | Ogai | 422/180 |
| 6,171,556 B1 | * | 1/2001 | Burk et al. | 422/173 |

FOREIGN PATENT DOCUMENTS

| | | |
|---|---|---|
| EP | 0 592 713 | 4/1994 |
| EP | 0 782 880 | 7/1997 |
| EP | 0 852 966 | 7/1998 |
| EP | 0 855 210 | 7/1998 |
| EP | 0 904 827 | 3/1999 |
| EP | 0 909 579 | 4/1999 |
| EP | 1 074 289 | 2/2001 |
| JP | 2-056247 | 2/1990 |
| JP | 5-059942 | 3/1993 |
| JP | 6-074019 | 3/1994 |
| JP | 6-142457 | 5/1994 |
| JP | 7-102957 | 4/1995 |
| JP | 7-144119 | 6/1995 |
| WO | 99/56859 | 11/1999 |

* cited by examiner

Primary Examiner—Steven P. Griffin
Assistant Examiner—Cam N. Nguyen
(74) Attorney, Agent, or Firm—Foley & Lardner

(57) ABSTRACT

An exhaust gas purifying catalyst comprises a hydrocarbon adsorbent layer containing zeolite as a main component and a metal-based catalyst layer containing any noble metal such as palladium, platinum, rhodium, etc. on a monolithic support that has a plurality of cells whose sectional shape is a regular N-polygon. In the case that Rc is a distance from a center of gravity to an inner wall surface of the hydrocarbon adsorbent layer along a line extending from the center of gravity of the regular N-polygon in the cell sectional shape to a corner of the N-polygon, and Rf is a distance from the center of gravity to the inner wall surface of the hydrocarbon adsorbent layer along a line extending from the center of gravity perpendicularly to respective sides of the regular N-polygon, a ratio Rc/Rf is set to less than or equal to 1.7 in a cell sectional shape.

19 Claims, 7 Drawing Sheets

FIG. 5

TABLE 1

| | HC adsorbent layer | | | | Metal-based catalyst layer | | | |
|---|---|---|---|---|---|---|---|---|
| | Zeolite type | Zeolite component ratio | Metal impregnated in zeolite | Zeolite amount (g/L) | Noble metal component Pd(g/L) | Pt(g/L) | Rh(g/L) | BaO amount (g/L) |
| EXAMPLE #1 | β | 100 | — | 250 | 4.71 | 0 | 0.94 | 10 |
| EXAMPLE #2 | β, MFI | 90/10 | — | 250 | 4.71 | 0 | 0.94 | 10 |
| EXAMPLE #3 | β, MFI, USY | 90/5/5 | — | 250 | 4.71 | 0 | 0.94 | 10 |
| EXAMPLE #4 | β, MFI, AlPO | 95/2.5/2.5 | — | 250 | 4.71 | 0 | 0.94 | 10 |
| EXAMPLE #5 | β, MFI, SAPO | 95/2.5/2.5 | — | 250 | 4.71 | 0 | 0.94 | 10 |
| EXAMPLE #6 | β, MFI, MORDENITE | 95/2.5/2.5 | — | 250 | 4.71 | 0 | 0.94 | 10 |
| EXAMPLE #7 | β, MFI, FERRIERITE, A TYPE | 95/2.5/2.5 | — | 250 | 4.71 | 0 | 0.94 | 10 |
| EXAMPLE #8 | β | 100 | Pd | 250 | 4.71 | 0 | 0.94 | 10 |
| EXAMPLE #9 | β | 100 | P | 250 | 4.71 | 0 | 0.94 | 10 |
| EXAMPLE #10 | β | 100 | Ca | 250 | 4.71 | 0 | 0.94 | 10 |
| EXAMPLE #11 | β | 100 | Mg | 250 | 4.71 | 0 | 0.94 | 10 |
| EXAMPLE #12 | β | 100 | La | 250 | 4.71 | 0 | 0.94 | 10 |
| EXAMPLE #13 | β | 100 | B | 250 | 4.71 | 0 | 0.94 | 10 |
| EXAMPLE #14 | β | 100 | Ag | 250 | 4.71 | 0 | 0.94 | 10 |
| EXAMPLE #15 | β | 100 | P, Ca, Zr, La | 250 | 4.71 | 0 | 0.94 | 10 |
| EXAMPLE #16 | β | 100 | P, Mg, Zr, Ce | 250 | 4.71 | 0 | 0.94 | 10 |
| EXAMPLE #17 | β | 100 | B, Ca, La, Ce, Nd | 250 | 4.71 | 0 | 0.94 | 10 |
| EXAMPLE #18 | β | 100 | — | 250 | 4.71 | 0 | 0.47 | 10 |
| EXAMPLE #19 | β | 100 | — | 250 | 4.71 | 0.47 | 0.94 | 10 |
| EXAMPLE #20 | β | 100 | — | 250 | 4.71 | 0 | 0.94 | 10 |
| EXAMPLE #21 | β | 100 | — | 250 | 4.71 | 0 | 0.94 | 10 |
| EXAMPLE #22 | β | 100 | — | 250 | 4.71 | 0 | 0.94 | 10 |
| EXAMPLE #23 | β | 100 | — | 50 | 4.71 | 0 | 0.94 | 10 |
| EXAMPLE #24 | β | 100 | — | 50 | 4.71 | 0 | 0.94 | 10 |
| EXAMPLE #25 | β | 100 | — | 50 | 4.71 | 0 | 0.94 | 10 |
| EXAMPLE #26 | β | 100 | — | 50 | 4.71 | 0 | 0.94 | 10 |
| EXAMPLE #27 | A | 100 | — | 250 | 4.71 | 0 | 0.94 | 10 |
| EXAMPLE #28 | USY | 100 | — | 250 | 4.71 | 0 | 0.94 | 10 |
| EXAMPLE #29 | MFI | 100 | — | 250 | 4.71 | 0 | 0.94 | 10 |
| EXAMPLE #30 | β | 100 | — | 250 | 4.71 | 0 | 0.94 | — |
| EXAMPLE #31 | β | 100 | — | 250 | 4.71 | 0 | 0.94 | 50 |

FIG. 6

TABLE 2

| | Cell shape | Number of cells / thickness | Rc/Rf (—) | (X−Rc)/(Y−Rf) (—) | SN/Sf (—) | Average thickness of a zeolite layer at flat portions in a cell (μm) | Area having a zeolite layer of more than 50 μm /total inner wall area (%) |
|---|---|---|---|---|---|---|---|
| EXAMPLE #1 | Triangle | 200cells/50 μm | 1.5 | 20.5 | 1.87 | 75 | 52 |
| EXAMPLE #2 | Triangle | 200cells/50 μm | 1.6 | 17.2 | 1.87 | 75 | 50 |
| EXAMPLE #3 | Triangle | 200cells/50 μm | 1.5 | 11.0 | 1.99 | 75 | 53 |
| EXAMPLE #4 | Triangle | 200cells/50 μm | 1.4 | 12.6 | 1.99 | 75 | 51 |
| EXAMPLE #5 | Triangle | 200cells/50 μm | 1.6 | 6.8 | 2.12 | 75 | 53 |
| EXAMPLE #6 | Triangle | 200cells/50 μm | 1.6 | 9.4 | 1.99 | 75 | 52 |
| EXAMPLE #7 | Triangle | 200cells/50 μm | 1.6 | 9.4 | 1.99 | 75 | 51 |
| EXAMPLE #8 | Triangle | 200cells/50 μm | 1.6 | 9.4 | 1.99 | 75 | 50 |
| EXAMPLE #9 | Triangle | 200cells/50 μm | 1.6 | 9.4 | 1.99 | 75 | 53 |
| EXAMPLE #10 | Triangle | 200cells/50 μm | 1.6 | 9.4 | 1.99 | 75 | 52 |
| EXAMPLE #11 | Triangle | 200cells/50 μm | 1.6 | 9.4 | 1.99 | 75 | 52 |
| EXAMPLE #12 | Triangle | 200cells/50 μm | 1.7 | 22.0 | 1.83 | 75 | 52 |
| EXAMPLE #13 | Triangle | 200cells/50 μm | 1.6 | 21.1 | 1.85 | 75 | 52 |
| EXAMPLE #14 | Triangle | 200cells/50 μm | 1.6 | 17.2 | 1.87 | 75 | 52 |
| EXAMPLE #15 | Triangle | 200cells/50 μm | 1.6 | 12.7 | 1.92 | 75 | 52 |
| EXAMPLE #16 | Triangle | 200cells/50 μm | 1.6 | 9.4 | 1.99 | 75 | 51 |
| EXAMPLE #17 | Triangle | 200cells/50 μm | 1.6 | 10.3 | 1.97 | 75 | 51 |
| EXAMPLE #18 | Triangle | 200cells/50 μm | 1.6 | 11.4 | 1.94 | 75 | 50 |
| EXAMPLE #19 | Square | 200cells/10mil | 1.3 | 9.6 | 1.34 | 150 | 70 |
| EXAMPLE #20 | Square | 300cells/6mil | 1.1 | 9.1 | 1.41 | 150 | 75 |
| EXAMPLE #21 | Hexagon | 400cells/6mil | 1.1 | 1.7 | 1.14 | 150 | 78 |
| EXAMPLE #22 | Triangle | 200cells/50 μm | 1.3 | 19.7 | 1.92 | 75 | 52 |
| EXAMPLE #23 | Triangle | 200cells/50 μm | 1.7 | 57.6 | 1.79 | 25 | 0 |
| EXAMPLE #24 | Square | 200cells/10mil | 1.3 | 13.7 | 1.31 | 25 | 0 |
| EXAMPLE #25 | Square | 300cells/6mil | 1.4 | 10.1 | 1.31 | 25 | 0 |
| EXAMPLE #26 | Hexagon | 400cells/6mil | 1.1 | 4.1 | 1.07 | 25 | 0 |
| EXAMPLE #27 | Triangle | 200cells/50 μm | 1.5 | 20.5 | 1.87 | 75 | 50 |
| EXAMPLE #28 | Triangle | 200cells/50 μm | 1.5 | 20.5 | 1.87 | 75 | 51 |
| EXAMPLE #29 | Triangle | 200cells/50 μm | 1.5 | 20.5 | 1.87 | 75 | 53 |
| EXAMPLE #30 | Triangle | 200cells/50 μm | 1.5 | 20.5 | 1.87 | 75 | 52 |
| EXAMPLE #31 | Triangle | 200cells/50 μm | 1.5 | 20.5 | 1.87 | 75 | 51 |

FIG. 7

TABLE3

| | HC adsorption rate (%) | Purification rate of adsorbed HC (%) | Reducing rate of cold HC (%) |
|---|---|---|---|
| EXAMPLE #1 | 76 | 56 | 43 |
| EXAMPLE #2 | 77 | 56 | 43 |
| EXAMPLE #3 | 78 | 56 | 44 |
| EXAMPLE #4 | 77 | 57 | 44 |
| EXAMPLE #5 | 77 | 56 | 43 |
| EXAMPLE #6 | 78 | 57 | 44 |
| EXAMPLE #7 | 77 | 56 | 43 |
| EXAMPLE #8 | 77 | 58 | 43 |
| EXAMPLE #9 | 78 | 59 | 45 |
| EXAMPLE #10 | 78 | 59 | 46 |
| EXAMPLE #11 | 77 | 58 | 45 |
| EXAMPLE #12 | 79 | 58 | 46 |
| EXAMPLE #13 | 77 | 57 | 44 |
| EXAMPLE #14 | 77 | 57 | 44 |
| EXAMPLE #15 | 78 | 58 | 45 |
| EXAMPLE #16 | 78 | 59 | 46 |
| EXAMPLE #17 | 79 | 59 | 47 |
| EXAMPLE #18 | 76 | 60 | 46 |
| EXAMPLE #19 | 76 | 60 | 46 |
| EXAMPLE #20 | 77 | 59 | 45 |
| EXAMPLE #21 | 77 | 59 | 45 |
| EXAMPLE #22 | 76 | 59 | 45 |
| EXAMPLE #23 | 70 | 15 | 11 |
| EXAMPLE #24 | 70 | 15 | 11 |
| EXAMPLE #25 | 71 | 16 | 11 |
| EXAMPLE #26 | 71 | 17 | 12 |
| EXAMPLE #27 | 33 | 9 | 3 |
| EXAMPLE #28 | 51 | 13 | 7 |
| EXAMPLE #29 | 63 | 15 | 9 |
| EXAMPLE #30 | 76 | 39 | 30 |
| EXAMPLE #31 | 45 | 55 | 25 |

U.S. 6,444,610 B1

EXHAUST GAS PURIFYING CATALYST

BACKGROUND OF THE INVENTION

1. Field of the Invention

The present invention relates to a catalyst for purifying exhaust gases exhausted from an internal combustion engine of an automobile and, more particularly, an exhaust gas purifying catalyst for removing effectively high concentration hydrocarbons exhausted in engine start-up.

2. Description of the Related Art

In the prior art, for the purpose of purifying the exhaust gases from the internal combustion engine of the automobile, etc., the three-way catalyst that can perform oxidation of carbon monoxide (CO) and hydrocarbons (HC) and reduction of nitrogen oxides (NOx) simultaneously has been widely employed.

A large amount of HC, which is called "cold HC", are exhausted at the low temperature in the engine start-up. However, since the exhaust gas temperature must be kept at more than 300° C. to make the above three-way catalyst active, the three-way catalyst is inactive at the low temperature immediately after the engine start-up. Therefore, if only the three-way catalyst in the prior art is employed, the cold HC is not purified but exhausted as it is.

In recent years, for the purpose of purifying this "cold HC", the HC adsorbing catalyst employing the zeolite has been developed.

The HC adsorbing catalyst is such a catalyst that adsorbs and holds temporarily the cold HC in the engine start-up during when the three-way catalyst is not activated, and then desorbs HC gradually to purify HC by using the three-way catalyst when the three-way catalyst is activated after the temperature of the exhaust gas is increased.

In the exhaust gas, there are various HCs having different molecular weights. Since the HC adsorbing catalyst using the zeolite has a correlation between an HC distribution in the exhaust gases and a pore diameter in the zeolite, the zeolite having the optimum pore diameter must be employed.

In the prior art, the pore diameter distribution is adjusted by blending the MFI-type zeolite as the main element with the zeolite (e.g., USY type) having another pore diameter. However, since the distortion of the pore diameter and the adsorption/ desorption characteristic is different after long time use according to the zeolite type, adsorption of the HCs in the exhaust gas becomes insufficient.

In the prior art, there are a three-way catalyst in which the noble metals such as platinum (Pt), palladium (Pd), rhodium (Rh), etc. are contained in the same layer, and another three-way catalyst in which the Rh layer and the Pd layer are coated separately, etc. Japanese Laid-Open Patent Publication Hei 2-56247 published in 1990 discloses an exhaust gas purifying catalyst in which the second layer containing the noble metals such as Pt, Pd, Rh, etc. as the main component and having the three-way catalytic function is provided on the first layer containing the zeolite as the main component.

Also the above HC absorbing catalysts are disclosed in Japanese Laid-Open Patent Publications Hei 6-74019 published in 1994, Hei 7-144119 published in 1995, Hei 6-142457 published in 1994, Hei 5-59942 published in 1993, and Hei 7-102957 published in 1995.

SUMMARY OF THE INVENTION

The three-way catalysts are strongly affected by the exhaust gas temperature and the air-fuel ratio (A/F). In order to cause these three-way catalysts to effectively serve their purifying function, the air-fuel ratio must be set in the vicinity of a stoichometric air-fuel ratio (A/F=14.6) at which the oxidation of HC and CO and the reduction of NOx are balanced. However, in the exhaust gas purifying catalyst in which the three-way catalyst layer is provided on the zeolite layer having the HC adsorbing function, since HC which has been adsorbed in the low temperature zone of the exhaust gas immediately after the start of the internal combustion engine is gradually desorbed with the increase of the exhaust gas temperature, the exhaust gas becomes fuel-rich. Therefore, the three-way catalyst cannot fulfill sufficiently the purification function, the purification of HC, CO, Nox cannot be achieved with good balance. As a result, if the HC desorption speed from the zeolite layer is too early, the effective HC purification cannot be achieved.

In addition, in the prior art, in the exhaust gas purifying catalyst that has the three-way catalyst layer on the zeolite layer, no particular study of a ratio of respective layer thickness has been made. However, according to the study made by the inventor of the present invention, it is found that, in the HC adsorbing catalyst that has the multi-layered structure consisting of the zeolite layer and the metal-based catalyst layer, the HC adsorption/desorption/purification cycle cannot be effectively carried out if the structure of respective layers is not proper.

In view of these subjects in the prior art, it is an object of the present invention to provide an exhaust gas. purifying catalyst capable of purifying effectively HC in the exhaust gas from the internal combustion engine at the low temperature immediately after the engine start-up.

A first aspect of the present invention provides an exhaust gas purifying catalyst, comprising a monolithic support including a plurality of cells whose sectional shape is an almost regular N-polygon (N is a natural number of more than or equal to 3), a hydrocarbon adsorbent layer containing zeolite as a main component formed on the monolithic support, a metal-based catalyst layer containing at least one type noble metal selected from the group consisting of platinum, palladium, and rhodium formed on the hydrocarbon adsorbent layer. Then, the hydrocarbon adsorbent layer is formed to satisfy a ratio Rc/Rf in a cell sectional shape that is set less than or equal to 1.7, where Rc is a distance from a center of gravity to an inner wall surface of the hydrocarbon adsorbent layer along a line extending from the center of gravity of the regular N-polygon in the cell sectional shape to a corner of the N-polygon, and Rf is a distance from the center of gravity to the inner wall surface of the hydrocarbon adsorbent layer along a line extending from the center of gravity perpendicularly to respective sides of the regular N-polygon.

It is preferable that, if the N-polygon is an almost regular triangle (N=3), the ratio Rc/Rf of the distance Rc to the distance Rf is set to satisfy Rc/Rf≦1.6.

It is preferable that, if the N-polygon is an almost regular quadrangle (N=4), the ratio Rc/Rf of the distance Rc to the distance Rf is set to satisfy Rc/Rf≦1.3.

The value of the ratio Rc/Rf tends to increase as the film thickness of the HC adsorbent layer becomes thinner. In the case that the ratio Rc/Rf is larger than 1.7, desorption of HC becomes quick if the thickness of the HC adsorbent layer is too thin, so that the sufficient function as the HC trapper cannot be performed.

A second aspect of the present invention provides an exhaust gas purifying catalyst, comprising a monolithic support having a plurality of cells whose sectional shape is an almost regular N-polygon (N is a natural number of more than or equal to 3), a hydrocarbon adsorbent layer containing zeolite as a main component formed on the monolithic support, and a metal-based catalyst layer containing at least one type noble metal selected from the group consisting of platinum, palladium, and rhodium formed on the hydrocarbon adsorbent layer and n, and wherein each cell sectional structure satisfies the following $$1 \leq (X-Rc)/(Y-Rf) < 40,$$

where X is a distance from a center of gravity of the regular N-polygon to corners of the regular N-polygon, Y is a shortest distance from the center of gravity to cell sides of the regular N-polygon, Rc is a distance from a center of gravity to an inner wall surface of the hydrocarbon adsorbent layer along a line extending from the center of gravity of the regular N-polygon in the cell sectional shape to a corner of the N-polygon, and Rf is a distance from the center of gravity to the inner wall surface of the hydrocarbon adsorbent layer along a line extending from the center of gravity perpendicularly to respective sides of the regular N-polygon.

The value of $(X-Rc)/(Y-Rf)$ exhibits a tendency to reduce as the film thickness of the HC adsorbent layer becomes thicker. If the ratio $(X-Rc)/(Y-Rf)$ is more than or equal to 40, the thickness of the HC adsorbent layer is too thin and thus desorption of HC becomes quick. Hence, the hydrocarbon adsorbent layer cannot sufficiently perform the function of the HC trapper. In contrast, if the ratio $(X-Rc)/(Y-Rf)$ is less than 1, the thickness of the hydrocarbon adsorbent layer is too thick and thus the cavities in the center of the cells are blocked. Hence, the pressure of the exhaust gases passing through the cavities of the cells is increased. As a result, since the HC desorption is accelerated, the HC trapping function of the hydrocarbon adsorbent layer is disturbed.

Therefore, According to the second aspect of the present invention, since the relative film thickness of the hydrocarbon adsorbent layer can be controlled in respective cells by setting the ratio $(X-Rc)/(Y-Rf)$ within the appropriate range, the exhaust gases purifying catalyst which can suppress the desorption of HC and achieve the good HC trapping function can be provided.

BRIEF DESCRIPTION OF THE DRAWINGS

FIG. 5 is table 1 showing compositions and structures of the exhaust gas purifying catalysts that are prepared in respective examples in the present invention;

FIG. 6 is table 2 showing compositions and structures of the exhaust gas purifying catalysts that are prepared in respective examples in the present invention; and FIG. 7 is table 3 showing adsorbed amount, adsorption rate, and reducing rate of cold HC by the exhaust gas purifying catalysts that are prepared in respective examples in the present invention.

DESCRIPTION OF THE PREFERRED EMBODIMENTS

Exhaust gas purifying catalysts according to embodiments of the present invention will be explained in detail hereinafter.

The exhaust gas purifying catalyst according to the present embodiment comprises a hydrocarbon adsorbent layer (referred to as a "HC adsorbent layer" hereinafter) containing as a main component a zeolite coated on a monolithic support whose cell sectional shape is almost regular N-polygon, and a metal-based catalyst layer coated on the HC adsorbent layer and having the three-way catalyst consisting of Pd, Pt or Rh, and any their combination.

Figure 1:
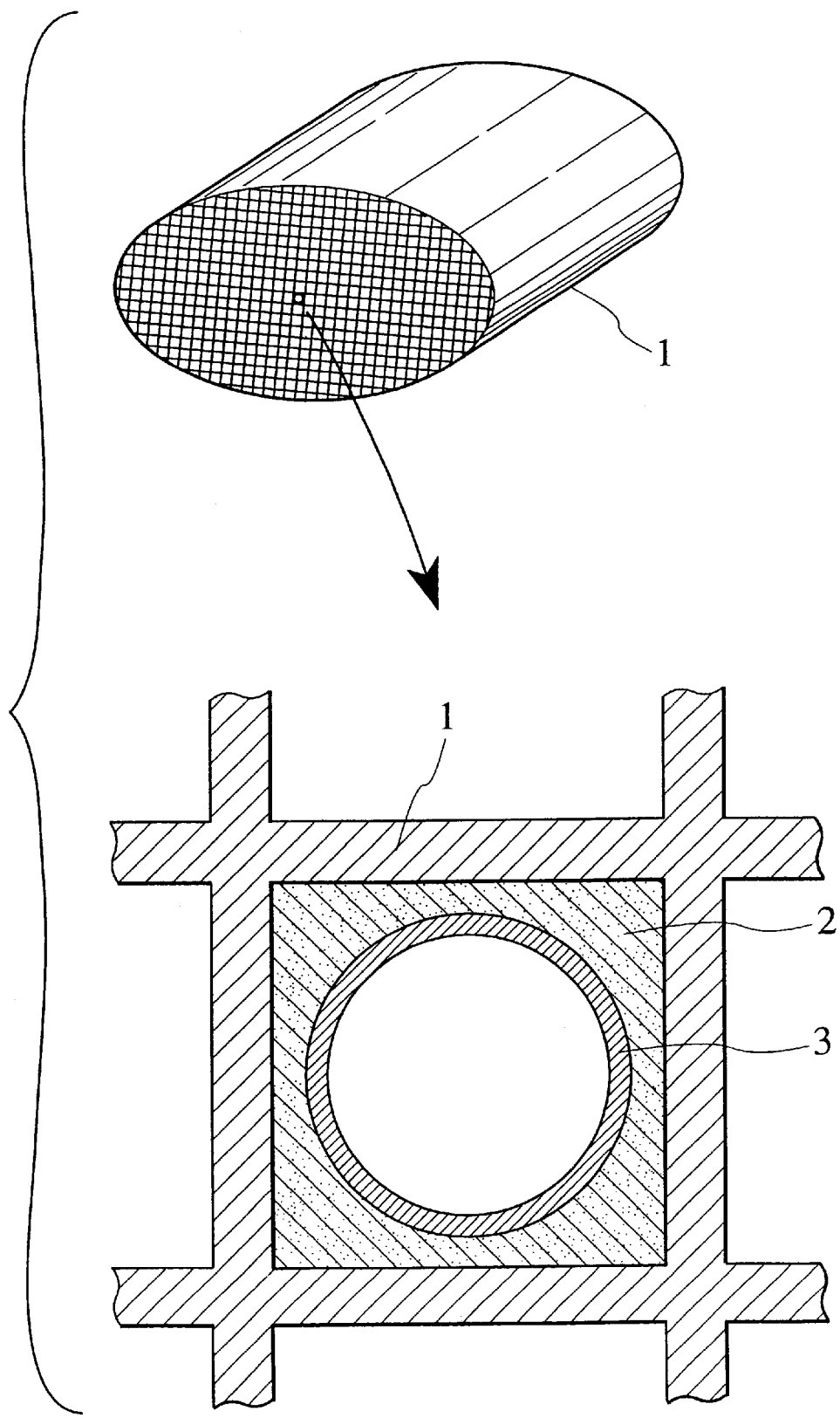
FIG. 1 is a perspective view showing a configuration of an exhaust gas purifying catalyst using a monolithic support having a cell whose sectional shape is a regular quadrangle according to an embodiment of the present invention, and a partial sectional view showing a part of the catalyst.

FIG. 1 shows a configuration of the exhaust gas purifying catalyst using the monolithic support whose cell sectional shape is a regular quadrangle, according to the embodiment of the present invention. An outer perspective view of the exhaust gas purifying catalyst is illustrated on the upper side of FIG. 1, and an enlarged sectional view of a part of the exhaust gas purifying catalyst is illustrated on the lower side of FIG. 1. A large number of hollow cells, each has an almost regular quadrangle sectional shape, are formed in a monolithic support 1. An HC adsorbent layer 2 is coated in the cell of the monolithic support 1, and a metal-based catalyst layer 3 is coated on the HC adsorbent layer 2.

In this manner, since the metal-based catalyst layer 3 having the three-way catalytic function is coated on the zeolite layer as the HC adsorbent layer 2, the exhaust gas purifying catalyst according to the present embodiment can purify effectively HC desorbed from the zeolite.

As shown in the sectional view in FIG. 1, the zeolite layer as the HC adsorbent layer 2 tends to be formed thicker in the neighborhood of vertexes that are four corners of the regular quadrangle cell. For this reason, if a layer thickness is adjusted, the zeolite layer can be formed such that an almost circular cavity with a radius R and with the center of gravity of the regular quadrangle(i.e. square) for its center is left. The metal-based catalyst layer 3 formed on the zeolite layer can be formed to follow a shape of the HC adsorbent layer 2. A gas passing portion that is an almost circular hollow portion is specified by the metal-based catalyst layer 3 in the center of the cell.

The cell sectional shape is not limited to the above shapes, and various regular N-polygons may be employed. There is no necessity that the cell sectional shape should be always formed as the complete regular N-polygon, and thus slightly deformation may be applied to the cell sectional shape.

The exhaust gas purifying catalyst of the present embodiment can improve not only HC adsorbing/desorbing performance but also HC purifying performance by adjusting the sectional shape, especially, the layer thickness of the HC adsorbent layer 2, to control diffusion speed of HC desorbed from the inside of the cell.

Figure 2A:
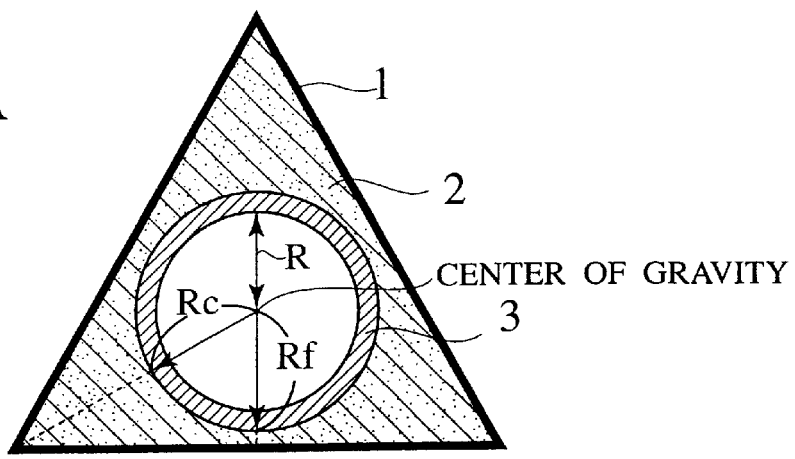
FIGS. 2A, 2B and 2C are a partial sectional views showing the cell having a regular triangle shape, a regular quadrangle shape and a regular hexagonal shape respectively.
Figure 2B:
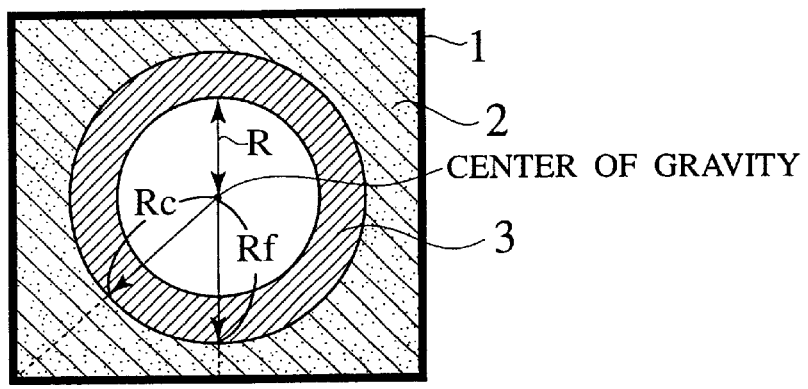
Figure 2C:
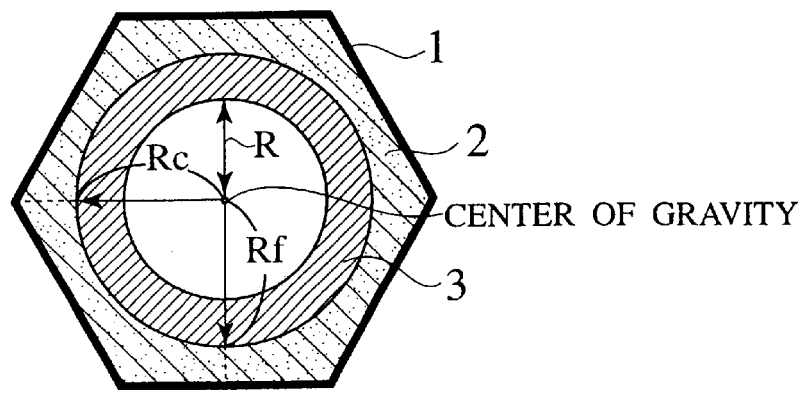

In addition, as shown in FIGS. 2A to FIG. 2C, the exhaust gas purifying catalyst according to the present embodiment is characterized in that a ratio Rc/Rf is set to less than or equal to 1.7, where Rc is a distance from the center of gravity to the inner wall surface of the HC adsorbent layer 2 along a line extending from the center of gravity of the regular N-polygon in the cell sectional shape to a corner of the N-polygon, and Rf is a distance from the center of gravity to the inner wall surface of the HC adsorbent layer 2 along a line extending from the center of gravity perpendicularly to respective sides of the regular N-polygon.

When the thickness of the HC adsorbent layer 2 is thin, a value of the ratio Rc/Rf is large; But the value of the ratio Rc/Rf is reduced with the increase of the thickness of the HC adsorbent layer 2. Then, when the sectional shape of the inner wall surface of the HC adsorbent layer 2 becomes a complete circle, the ratio Rc/Rf is 1.

If the ratio Rc/Rf exceeds 2, the sufficient thickness of the adsorbent layer cannot be assured to reduce the HC adsorbed amount and to accelerate the HC desorption.

The value of the ratio Rc/Rf of each cell sectional shape will be explained in more detail hereinafter.

First, as shown in FIG. 2, if the cell sectional shape is an almost regular triangle, it is preferable that the ratio Rc/Rf should be set to less than or equal to 1.6. If this ratio is in excess of 1.6, the thickness of the HC adsorbent layer is insufficient and thus HC desorption becomes too early. More preferably, the ratio Rc/Rf should be set to less than or equal to 1.4.

If the cell sectional shape is an almost regular quadrangle, it is preferable that the ratio Rc/Rf should be set to less than or equal to 1.3. If this ratio is in excess of 1.3, the thickness of the HC adsorbent layer is insufficient and thus HC desorption is too early. More preferably, the ratio Rc/Rf should be set to less than or equal to 1.2.

Then if the cell sectional shape is an almost regular N-polygon (N≧5), it is preferable that the ratio Rc/Rf should be set to less than or equal to 1.1. If this ratio is in excess of 1.1, the thickness of the HC adsorbent layer is insufficient and thus HC desorption is too early.

Also the thickness of the HC adsorbent layer may be defined by a ratio of sectional areas in the HC adsorbent layer. More particularly, in order to cause the cell to exhibit the HC adsorbing/desorption ability characteristic more effectively, it is preferable that, if the cell sectional shape is the almost regular triangle, a ratio S3/Sf of an area S3 of the regular triangle to an area Sf of an inscribed circle of the regular triangle, which has the above radius Rf, should be set to more than or equal to 1.67. If the ratio S3/Sf is less than 1.67, the thickness of the HC adsorbent layer is insufficient and thus HC desorption becomes too fast.

If the cell sectional shape is the almost regular quadrangle, a ratio S4/Sf of an area S4 of the regular quadrangle to an area Sf of an inscribed circle of the regular quadrangle, which has the above radius Rf, should be set to more than or equal to 1.28. If the ratio S4/Sf is less than 1.28, the thickness of the HC adsorbent layer is insufficient and thus HC desorption becomes too fast.

Then, if the cell sectional shape is a regular N-polygon (N≧5), it is preferable that a ratio SN/Sf of an area SN of the regular N-polygon to the area Sf of its inscribed circle should be set to more than or equal to 1.1. If the ratio SN/Sf is less than 1.1, the thickness of the HC adsorbent layer is insufficient and thus HC desorption becomes too early.

Further, in the exhaust gas purifying catalyst according to the present embodiment, it is preferable that a difference (Y−Rf) should be set to more than or equal to 35 $\mu$m, where Y is a shortest distance from the center of gravity of the cell sectional shape to the cell sides (distance of a line extended perpendicularly to the cell sides from the center of gravity) and Rf is the distance from the center of gravity of the regular N-polygon to the inner surface of the HC adsorbent layer, and that a volume of the HC adsorbent layer to satisfy the above relationship should occupy more than or equal to 50% of an overall volume of the HC adsorbent layer in the entire monolithic support.

In this manner, the HC desorption is effectively delayed by controlling the thickness of the HC adsorbent layer, so that the desorbed HC purifying performance can be improved further more. If the above difference (Y−Rf) is less than 35 $\mu$m, an HC holding force of the HC adsorbent layer is reduced. Thus, sometimes the sufficient purifying performance of the metal-based catalyst layer formed thereon cannot be attained.

On the other hand, if a volume occupation rate of the above HC adsorbent layer is reduced less than 50% since a thickness distribution of the HC adsorbent layer is deviated, the HC desorption becomes fast and in some cases the sufficient purification performance cannot be achieved.

Figure 3A:
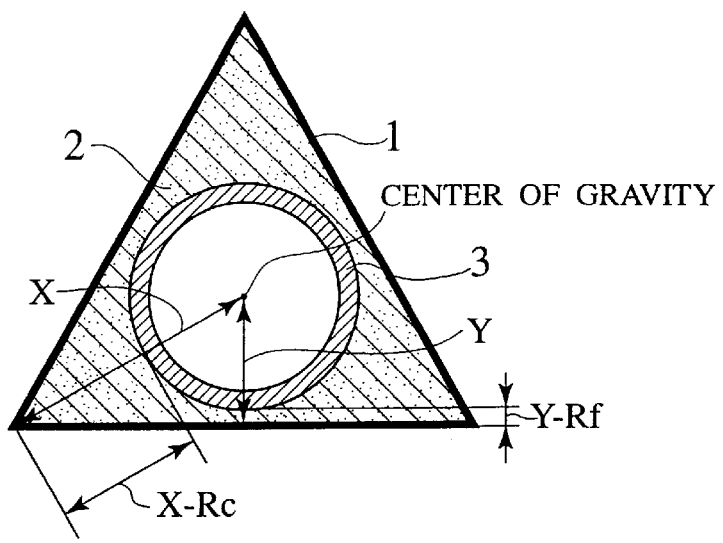
FIGS. 3A, 3B and 3C are a partial sectional views showing the cell having a regular triangle shape, a regular quadrangle shape and a regular hexagonal shape respectively.
Figure 3B:
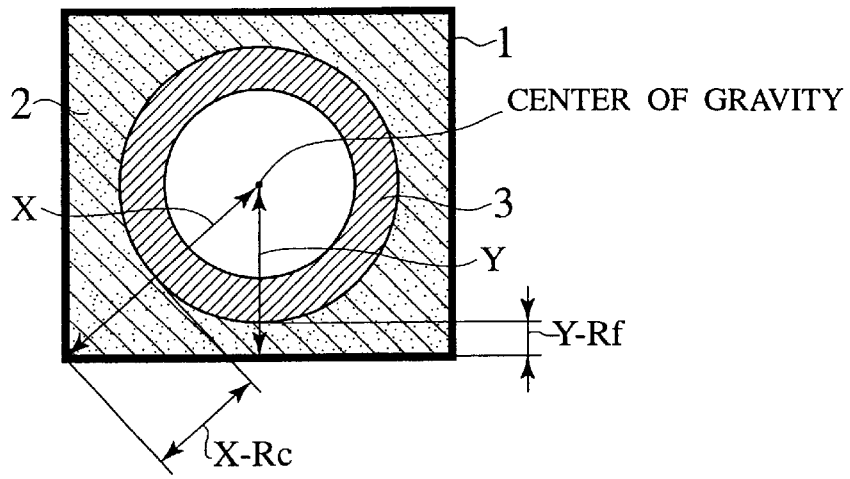
Figure 3C:
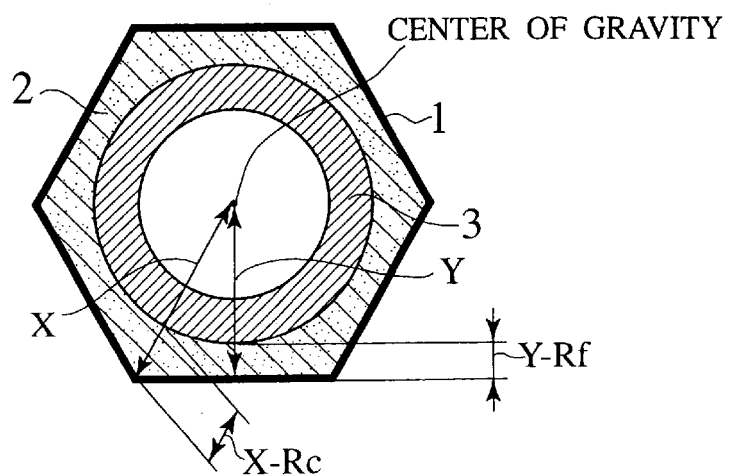

Also, the exhaust gases purifying catalyst according to the present embodiment satisfies $$1 \leq (X-Rc)/(Y-Rf) < 40,$$

where, as shown in FIG. 3A to FIG. 3C, X is a distance from a center of gravity of the regular N-polygon to corners of the regular N-polygon, Y is a shortest distance from the center of gravity to cell sides of the regular N-polygon.

The value of (X−Rc)/(Y−Rf) shows a tendency to reduce with the increase in the film thickness of the HC adsorbent layer. If the ratio (X−Rc)/(Y−Rf) is more than 40, the thickness of the HC adsorbent layer is too thin and thus desorption of HC becomes quick. Hence, the HC adsorbent layer cannot sufficiently perform the function of the HC trapper. In contrast, if the ratio (X−Rc)/(Y−Rf) is less than 1, the thickness of the HC adsorbent layer is too thick and thus the cavities in the center of the cells are blocked. Hence, the pressure of the exhaust gases passing through the cavities of the cells is increased. As a result, since the HC desorption is accelerated, the HC trapping function of the HC adsorbent layer is disturbed.

The suitable condition of the value (X−Rc)/(Y−Rf) for each cell sectional shape will be given hereinbelow. First, as shown in FIG. 3A, in the case that the cell sectional shape of the monolithic support is an almost regular triangle, the thickness of the HC adsorbent layer is insufficient and the desorption of HC becomes quick if the value (X−Rc)/(Y−Rf) is more than 25. Therefore, it is preferable that the value (X−Rc)/(Y−Rf) should be set to satisfy $$1 \leq (X-Rc)/(Y-Rf) < 25.$$

Also, as shown in FIG. 3B, in the case that the cell sectional shape of the monolithic support is an almost regular quadrangle, the thickness of the HC adsorbent layer is insufficient and the desorption of HC becomes quick if the value (X−Rc)/(Y−Rf) is more than 10. Therefore, it is preferable that the value (X−Rc)/(Y−Rf) should be set to satisfy $$1 \leq (X-Rc)/(Y-Rf) < 10.$$

In addition, as shown in FIG. 3C, in the case that the cell sectional shape of the monolithic support is a regular N-polygon (N≧5), the thickness of the HC adsorbent layer is insufficient and the desorption of HC becomes quick if the value (X−Rc)/(Y−Rf) is more than 2. Therefore, it is preferable that the value (X−Rc)/(Y−Rf) should be set to satisfy $$1 \leq (X-Rc)/(Y-Rf) < 2.$$

Next, components of the above HC adsorbent layer and the metal-based catalyst layer, etc. will be explained hereunder.

First, the zeolite type employed in the HC adsorbent layer is satisfactory and is not particularly limited if it can perform the HC adsorption/desorption ability characteristic. It is preferable that the H-type β-zeolite whose Si/2Al ratio is 10 to 500 should be used as a main component.

In this case, in the adsorption/purification by the HC adsorbing catalyst using the zeolite, since there is a correlation between the HC molecule distribution in the exhaust gas and the pore diameter of the zeolite, the zeolite having the optimum pore diameter must be selected. In the prior art, the pore distribution is adjusted by blending the MFI-type zeolite (ZSM5) as the main component with the zeolite having other pore diameter (e.g., USY type, etc.). However, since distortion of the pore diameter and the adsorption/desorption characteristic are different according to the zeolite type after the long time use, adsorption of the HC in the exhaust gas becomes insufficient.

If the β-zeolite that contains two types of the pore diameters in the structure is employed as the main component of the HC adsorbent layer, change in the structure after the long time use can be reduced and the pore distribution can be maintained widely from the beginning to the end of the endurance time. Therefore, the HC adsorption/desorption characteristic can be improved rather than the prior art.

In this case, it is not preferable that, if the Si/2Al ratio exceeds 500, the structural stability effect is saturated whereas, if the Si/2Al ratio is less than 10, the zeolite lacks the structural stability.

Moreover, in the exhaust gas purifying catalyst according to the present embodiment, different type of the zeolite may be added to the β-zeolite as the HC adsorbent layer. In this manner, since plural types of zeolites are used, various HC molecules contained in the exhaust gas can be adsorbed by the HC adsorbent layer.

As such different type zeolites, MFI-type zeolite, Y-type zeolite, USY-type zeolite, mordenite, ferrierite, A-type zeolite, X-type zeolite, $AlPO_4$ or SAPO and any their combination may be listed as examples.

Since the β-zeolite and these zeolite types, etc. are contained together, the pore distribution of the zeolite can be expanded and also the range of adsorbable HCs can be extended. In other words, the zeolite seeds that have the pore diameter suitable for the HC seeds to be adsorbed can be combined, and therefore a variety of HCs can be adsorbed effectively.

In addition, palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B), or zirconium (Zr), or any their mixture may be contained in the zeolite as the HC adsorbent layer.

The H-type zeolite has also the sufficient HC adsorbing ability. But the adsorption characteristic, the desorption suppressing ability, and the durability of the zeolite can be further improved by impregnating Pd, Mg, Ca, Sr, Ba, Ag, Y, La, Ce, Nd, P, B, Zr, etc. by virtue of the ordinary method such as the ion-exchange method, the dipping method, the immersion method, etc.

In addition, the range of adsorbable HCs can be extended and therefore a variety of HCs can be adsorbed effectively.

Furthermore, the noble metal consisting of Pt, Pd, or Rh and any their combination, zirconium oxide which contains Ce, Nd, or La, and any their combination by 1 to 40 mol % in terms of metal, and alumina may be contained in the HC adsorbent layer. In this case, it is preferable that Rh should be used as the noble metal.

In the exhaust gas purifying catalyst according to the present embodiment, the metal-based catalyst layer formed on the HC adsorbent layer carries out the purification of HC being desorbed from the HC adsorbent layer. Since the desorbed HC purifying performance is also attached to the HC adsorbent layer by containing the noble metal and the zirconium oxide into the HC adsorbent layer, the desorbed HC purifying performance in the overall exhaust gas purifying catalyst can be improved.

The alumina in addition to the noble metal such as Pt, Pd, Ph, etc. may be contained in the above metal-based catalyst layer. Such alumina can increase a specific surface area of the metal catalyst and can enhance a purification efficiency further more.

If cerium, zirconium, or lanthanum, and any their combination are added to the above alumina, the structural stability of the alumina for the long time use at the high temperature can be enhanced, and also phase transition into α-alumina and reduction in the BET specific surface area can be suppressed. In this case, it is preferable that the added amount is set to 1 to 10 mol % in terms of metal. If the added amount exceeds 10 mol %, an addition effect is saturated.

Typically, an amount of use of such alumina is 10 to 200 g per the catalyst 1 L. If such amount of the alumina is less than 10 g, enough distribution property of the noble metal cannot be obtained while, if the alumina is used larger than 200 g, the catalytic activity is saturated and thus the remarkable improvement effect cannot be achieved.

In addition, cerium oxide may be added in the above metal-based catalyst layer. As this cerium oxide, such an oxide may be employed that contains zirconium, neodymium, or lanthanum, and any their mixture by 1 to 40 mol % in terms of metal and also the cerium oxide by 60 to 99 mol % in terms of metal as the remaining portion.

Since the cerium oxide is contained in the metal-based catalyst layer, such cerium oxide having the high oxygen occluding ability discharges the lattice oxygen and the adsorbed oxygen in the fuel-rich atmosphere and in the neighborhood of stoichiometric. Thus the cerium renders the oxidation state of the noble metal to fit for the purification of the exhaust gas. Therefore, reduction in the catalytic activity of the catalyst can be suppressed. Also, if Pd is employed as the noble metal, reduction in the catalytic activity because of change in the chemical state can be suppressed.

The reason for setting a contained amount of the mixture such as zirconium, etc. in the above cerium oxide to 1 to 40 mol % is to. improve the oxygen discharge ability, the BET specific surface area, and the thermal stability of the cerium oxide remarkably by adding elements such as zirconium, etc. into the cerium oxide. If the contained amount is less than 1 mol %, the addition effect of the above elements does not appear whereas, if the contained amount exceeds 40 mol %, the above effect is saturated or is reduced inversely.

Moreover, it is preferable that the alkaline metal and/or the alkaline earth metal may be contained in the metal-based catalyst layer. As the available alkaline metal and alkaline earth metal, there are lithium (Li), sodium (Na), calcium (Ca), cesium (Cs), magnesium (Mg), strontium (Sr), and barium (Ba).

If these alkaline metal and alkaline earth metal are contained in the metal-based catalyst layer, the HC adsorption poisoning action can be alleviated in the fuel-rich atmosphere. Also, since the alkaline metal and/or the alkaline earth metal can suppress the sintering of the noble metal, durability of the metal-based catalyst layer can be improved and thus the purification performance of HC desorbed from the HC adsorbent layer after the long time use can be improved.

It is preferable that the contained amount of the alkaline metal and/or the alkaline earth metal should be selected to 1 to 40 g per the catalyst 1 liter. If the contained amount is less than 1 g, the HC adsorption poisoning and sintering of the noble metal cannot be suppressed whereas, if the contained amount exceeds 40 g, alkaline metal and/or the alkaline earth metal adding effect is saturated and inversely the performance of the catalyst is lowered.

As descried above, the exhaust gas purifying catalyst according to the present embodiment comprises the HC adsorbent layer (first layer) containing the zeolite as the main component, and the metal-based catalyst layer (second layer) laminated on the HC adsorbent layer to contain the noble metal as necessary constituent layers. In addition, another catalyst layer (third layer) may be laminated on the metal-based catalyst layer.

The above noble metal, the alumina, the zirconium oxide, the cerium oxide, and the alkaline metal and/or the alkaline earth metal may be contained in the third layer.

Especially, it is preferable that the zirconium oxide and the alkaline metal and/or the alkaline earth metal should be contained.

As descried above, the above zirconium oxide contains Ce, Nd or La and their mixed element by 1 to 40 mol % in terms of metal, and the remaining portion consists of zirconia. The oxygen discharge ability, the BET specific surface area, and the thermal stability of the zirconia can be improved remarkably by adding these elements. If the added elements is less than 1 mol %, the element adding effect is little. If the added elements exceeds 40 mol %, sometimes the element adding effect is saturated.

Since the zirconium oxide is contained in another catalyst layer (third layer), such zirconium oxide discharges the lattice oxygen and the adsorbed oxygen in the fuel-rich atmosphere and in the neighborhood of stoichiometoric and thus renders the oxidation state of the noble metal to fit for the purification of the exhaust gas. Therefore, reduction in the catalytic activity of the catalyst can be suppressed.

In this case, it is preferable that Pt should be contained in the above metal-based catalyst layer (second layer) and/or another catalyst layer (third layer). The poisoning resistant property of the catalytic component can be further improved by containing Pt as well as Pd or Rh.

Examples of the exhaust gas purifying catalyst according to the present embodiment will be explained hereinafter.

EXAMPLE #1

The slurry solution for the HC adsorbent layer is prepared by introducing β-zeolite powder (H type, Si/2Al=75) of 2257 g, silica sol (20% solid content) of 1215 g, and a pure water of 3000 g into a magnetic ball mill, and then crushing the mixture. This slurry solution is coated on the metal support whose cell sectional shape is a regular triangle. A cell density of the metal support is 200 cells/50 $\mu$m. After the coating, the excessive slurry in the cells is removed by an air flow. Then, the slurry is dried and then burned at 400° C. for one hour. A catalytic layer A acting as the HC adsorbent layer is formed by repeating the coating operation after the burning until the coated amount of the slurry comes up to 250 g/L.

The Pd-impregnated alumina powder (powder I) is prepared by impregnating the alumina powder containing 1 mol % Ce with a palladium dinitrodiamine aqueous solution or spraying the aqueous solution while stirring the alumina powder at a high speed, then drying the resultant at 150° C. for twenty four hours, and then burning the resultant at 400° C. for one hour and then at 600° C. for one hour. A Pd concentration in this powder I is 8.0 weight %. In this case, lanthanum, zirconium, neodymium, etc. may be contained into the powder I.

The Pd-impregnated cerium oxide powder (powder II) is prepared by impregnating the cerium oxide powder containing 1 mol % La and 32 mol % Zr with the palladium dinitrodiamine aqueous solution or spraying the aqueous solution while stirring the cerium oxide powder at a high speed, then drying the resultant at 150° C. for twenty four hours, and then burning the resultant at 400° C. for one hour and then at 600° C. for one hour. A Pd concentration in this powder II is 2.0 weight %.

Then, the slurry solution is prepared by introducing the Pd-impregnated alumina powder (powder I) of 530 g, the Pd-impregnated cerium oxide powder (powder II) of 235 g, the nitric acid alumina sol of 350 g (sol obtained by adding 10 weight % nitric acid into 10 weight % boehmite alumina), the barium carbonate of 130 g and the pure water of 2000 g into a magnetic ball mill, and then crushing the mixture. Then, this slurry solution is coated on the above catalytic layer A. Then, the excessive slurry in the cells is removed by the air flow. Then, the slurry is dried and then burned at 400° C. for one hour. Thus, a catalytic layer B acting as the metal-based catalyst layer is formed repeating the coating operation after the burning until the coated amount of the slurry comes up to 90 g/L. At this time, Ba is contained in the catalytic layer B as BaO by 10 g/L. Also, Pd is contained in the catalytic layer B by 4.71 g/L.

The Rh-impregnated alumina powder (powder III) is prepared by impregnating the alumina powder containing 3 weight % Zr with the rhodium nitrate aqueous solution or spraying the aqueous solution while stirring the alumina powder at a high speed, then drying the resultant at 150° C. for twenty four hours, and then burning the resultant at 400° C. for one hour and then at 600° C. for one hour. A Ph concentration in this powder III is 4.0 weight %.

Then, the slurry solution is prepared by introducing the Rh-impregnated alumina powder (powder III) of 235 g, the zirconium oxide powder of 50 g containing 1 mol % La and 20 mol % Ce, the nitric acid alumina sol of 150 g into the magnetic ball mill, and then crushing the mixture. Then, this slurry solution is coated on the above catalytic layer B. Then, the excessive slurry in the cells is removed by the air flow. Then, the slurry is dried and then burned at 400° C. for one hour. Thus, a catalytic layer C is formed repeating the coating operation after the burning until a weight of the coated layer comes up to 30 g/L. Rh is contained in the catalytic layer C by 0.94 g/L.

The catalytic layer B and the catalytic layer C correspond to the metal-based catalyst layer in the present embodiment. In this case, lanthanum, neodymium, etc. may be contained in the cerium oxide power and the alumina powder.

The average thickness of the HC adsorbent layer (zeolite layer) in EXAMPLE #1 is 75 $\mu$m at a flat portion of the cell. The ratio Rc/Rf is about 1.5 and the ratio (X−Rc)/(Y−Rf) is about 20.5.

EXAMPLE #2

As the zeolite added to the slurry for the HC adsorbent layer, the β-zeolite powder (H type, Si/2Al=75) of 2031 g, the MFI powder (ZSM5) of 226 g, and silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #2 is 75 $\mu$m at the flat portion of the cell. The ratio Rc/Rf is about 1.6 and the ratio (X−Rc)/(Y−Rf) is about 17.2.

EXAMPLE #3

As the zeolite added to the slurry for the HC adsorbent layer, the β-zeolite powder (H type, Si/2Al=75) of 2031 g, the MFI powder (ZSM5) of 113 g, USY powder of 113 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #3 is 75 μm at the flat portion of the cell. The ratio Rc/Rf is about 1.5 and the ratio (X−Rc)/(Y−Rf) is about 11.0.

EXAMPLE #4

As the zeolite added to the slurry for the HC adsorbent layer, the β-zeolite powder (H type, Si/2Al=75) of 2145 g, the MFI powder (ZSM5) of 56 g, AlPO$_4$ powder of 56 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #4 is 75 μm at the flat portion of the cell. The ratio Rc/Rf is about 1.4 and the ratio (X−Rc)/(Y−Rf) is about 12.6.

EXAMPLE #5

As the zeolite added to the slurry for the HC adsorbent layer, the β-zeolite powder (H type, Si/2Al=75) of 2145 g, the MFI powder (ZSM5) of 56 g, SAPO powder of 56 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #5 is 75 μm at the flat portion of the cell. The ratio Rc/Rf is about 1.6 and the ratio (X−Rc)/(Y−Rf) is about 6.8.

EXAMPLE #6

As the zeolite added to the slurry for the HC adsorbent layer, the β-zeolite powder (H type, Si/2Al=75) of 2145 g, the MFI powder (ZSM5) of 56 g, mordenite powder of 56 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #6 is 75 μm at the flat portion of the cell. The ratio Rc/Rf is about 1.6 and the ratio (X−Rc)/(Y−Rf) is about 9.4.

EXAMPLE #7

As the zeolite added to the slurry for the HC adsorbent layer, the β-zeolite powder (H type, Si/2Al=75) of 2145 g, the MFI powder (ZSM5) of 56 g, ferrierite powder of 28 g, A-type zeolite powder of 28 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #7 is 75 μm at the flat portion of the cell. The ratio Rc/Rf is about 1.6 and the ratio (X−Rc)/(Y−Rf) is about 9.4.

EXAMPLE #8

Pd-impregnated β-zeolite powders (Pd concentration is 0.5 weight %) are prepared by impregnating the β-zeolite powder (H type, Si/2Al=75) with palladium (Pd), then drying the resultant at 150° C. for twenty four hours, and then burning the resultant at 450° C. for one hour.

As the zeolite added to the slurry for the HC adsorbent layer, the above Pd-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #8 is 75 μm at the flat portion of the cell. The ratio Rc/Rf is about 1.6 and the ratio (X−Rc)/(Y−Rf) is about 20.5. The ratio Rc/Rf is about 1.6 and the ratio (X−Rc)/(Y−Rf) is about 9.4.

EXAMPLE #9

P-impregnated β-zeolite powders (P concentration is 0.4 weight %) are prepared by impregnating the β-zeolite powder (H type, Si/2Al=75) with phosphorus (P), then drying the resultant at 150° C. for twenty four hours, and then burning the resultant at 450° C. for one hour.

As the zeolite added to the slurry for the HC adsorbent layer, the β-zeolite powder (H type, Si/2Al=75) of 2031 g, the above P-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #9 is 75 μm at the flat portion of the cell. The ratio Rc/Rf is about 1.6 and the ratio (X−Rc)/(Y−Rf) is about 9.4.

EXAMPLE #10

Ca-impregnated β-zeolite powders (Ca concentration is 0.2 weight %) are prepared by impregnating the β-zeolite powder (H type, Si/2Al=75) with calcium (Ca), then drying the resultant at 150° C. for twenty four hours, and then burning the resultant at 450° C. for one hour.

As the zeolite added to the slurry for the HC adsorbent layer, the β-zeolite powder (H type, Si/2Al=75) of 2031 g, the above Ca-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #10 is 75 μm at the flat portion of the cell. The ratio Rc/Rf is about 1.6 and the ratio (X−Rc)/(Y−Rf) is about 9.4.

EXAMPLE #11

Mg-impregnated β-zeolite powders (Mg concentration is 0.4 weight %) are prepared by impregnating the 3 -zeolite powder (H type, Si/2Al=75) with magnesium (Mg), then drying the resultant at 150° C. for twenty four hours, and then burning the resultant at 450° C. for one hour.

As the zeolite added to the slurry for the HC adsorbent layer, the β-zeolite powder (H type, Si/2Al=75) of 2031 g, the above Mg-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #11 is 75 μm at the flat portion of the cell. The ratio Rc/Rf is about 1.6 and the ratio (X−Rc)/(Y−Rf) is about 9.4.

EXAMPLE #12

La-impregnated β-zeolite powders (La concentration is 0.4 weight %) are prepared by impregnating the β-zeolite powder (H type, Si/2Al=75) with lanthanum (La), then drying the resultant at 150° C. for twenty four hours, and then burning the resultant at 450° C. for one hour.

As the zeolite added to the slurry for the HC adsorbent layer, the β-zeolite powder (H type, Si/2Al=75) of 2031 g, the above La-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #12 is 75 μm at the flat portion of the cell. The ratio Rc/Rf is about 1.7 and the ratio (X−Rc)/(Y−Rf) is about 22.0.

EXAMPLE #13

B-impregnated β-zeolite powders (B concentration is 0.4 weight %) are prepared by impregnating the β-zeolite powder (H type, Si/2Al=75) with boron (B), then drying the resultant at 150° C. for twenty four hours, and then burning the resultant at 450° C. for one hour.

As the zeolite added to the slurry for the HC adsorbent layer, the β-zeolite powder (H type, Si/2Al=75) of 2031 g, the above B-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #13 is 75 μm at the flat portion of the cell. The ratio Rc/Rf is about 1.6 and the ratio (X−Rc)/(Y−Rf) is about 21.1.

EXAMPLE #14

Ag-impregnated β-zeolite powders (Ag concentration is 0.4 weight %) are prepared by impregnating the β-zeolite powder (H type, Si/2Al=75) with silver (Ag), then drying the resultant at 150° C. for twenty four hours, and then burning the resultant at 450° C. for one hour.

As the zeolite added to the slurry for the HC adsorbent layer, the β-zeolite powder (H type, Si/2Al=75) of 2031 g, the above Ag-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #14 is 75 μm at the flat portion of the cell. The ratio Rc/Rf is about 1.6 and the ratio (X−Rc)/(Y−Rf) is about 17.2.

EXAMPLE #15

P—Ca—Zr—La-impregnated β-zeolite powders (each metal concentration is 0.1 weight %, a total metal concentration is 0.4 weight %) are prepared by impregnating the β-zeolite powder (H type, Si/2Al=75) with P, Ca, Zr, La sequentially, and then drying and burning the resultant.

As the zeolite added to the slurry for the HC adsorbent layer, the β-zeolite powder (H type, Si/2Al=75) of 2031 g, the above P—Ca—Zr—La-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #15 is 75 μm at the flat portion of the cell. The ratio Rc/Rf is about 1.6 and the ratio (X−Rc)/(Y−Rf) is about 12.7.

EXAMPLE #16

P—Mg—Zr—Ce-impregnated β-zeolite powders (each metal concentration is 0.1 weight %, a total metal concentration is 0.4 weight %) are prepared by impregnating the β-zeolite powder (H type, Si/2Al=75) with P, Mg, Zr, Ce sequentially, and then drying and burning the resultant.

As the zeolite added to the slurry for the HC adsorbent layer, the β-zeolite powder (H type, Si/2Al=75) of 2031 g, the above P—Mg—Zr—Ce-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #16 is 75 μU m at the flat portion of the cell. The ratio Rc/Rf is about 1.6 and the ratio (X−Rc)/(Y−Rf) is about 9.4.

EXAMPLE #17

B—Ca—La—Nd-impregnated β-zeolite powders (each metal concentration is 0.1 weight %, a total metal concentration is 0.4 weight %) are prepared by impregnating the β-zeolite powder (H type, Si/2Al=75) with B, Ca, La, Nd sequentially, and then drying and burning the resultant.

As the zeolite added to the slurry for the HC adsorbent layer, the β-zeolite powder (H type, Si/2Al=75) of 2031 g, the above B—Ca—La—Nd-impregnated β-zeolite powder of 226 g, and the silica sol (20% solid content) of 1215 g are used. Other conditions are set to the same conditions as EXAMPLE #1, and the exhaust gas purifying catalyst is prepared.

The average thickness of the HC adsorbent layer (zeolite layer) in EXAMPLE #17 is 75 μm at the flat portion of the cell. The ratio Rc/Rf is about 1.6 and the ratio (X−Rc)/(Y−Rf) is about 10.3.

EXAMPLE #18

The Rh-impregnated alumina powder (powder IV) is prepared by impregnating the alumina powder containing 3 mol % Zr with a rhodium nitrate aqueous solution or spraying the aqueous solution while stirring the alumina powder at a high speed, then drying the resultant at 150° C. for twenty four hours, and then burning the resultant at 400° C. for one hour and then at 600° C. for one hour. A Rh concentration in this powder IV is 2.0 weight %.

The Pt-impregnated alumina powder (powder V) is prepared by impregnating the alumina powder containing 2 mol % Ce with a platinum dinitrodiamine aqueous solution or spraying the aqueous solution while stirring the alumina powder at a high speed, then drying the resultant at 150° C. for twenty four hours, and then burning the resultant at 400° C. for one hour and then at 600° C. for one hour. A Pt concentration in this powder V is 2.0 weight %.

Then, the slurry solution is prepared by introducing the Rh-impregnated alumina powder (powder IV) of 117.5 g, the Pt-impregnated alumina powder (powder V) of 117.5 g, the zirconium oxide powder of 50 g containing 1 mol % La and 20 mol % Ce, and the nitric acid alumina sol of 150 g into a magnetic ball mill, and then crushing the mixture.

Then, this slurry solution is coated on the above catalytic layer B. Other conditions are set to the same conditions as EXAMPLE #1, and the exhaust gas purifying catalyst is prepared.

The average thickness of the HC adsorbent layer (zeolite layer) in EXAMPLE #18 is 75 μm at the flat portion of the cell. The ratio Rc/Rf is about 1.6 and the ratio (X−Rc)l(Y−Rf) is about 11.4.

EXAMPLE #19

The cordierite monolithic support whose cell sectional shape is an almost regular quadrangle (i.e. square) is used as the support for the exhaust gas purifying catalyst. The cell density of this support is 200 cells/10 mil. Other conditions are set to the same conditions as EXAMPLE #1, and the exhaust gas purifying catalyst is prepared.

The average thickness of the HC adsorbent layer (zeolite layer) in EXAMPLE #19 is 150 μm at the flat portion of the cell. The ratio Rc/Rf is about 1.3 and the ratio (X−Rc)/(Y−Rf) is about 9.6.

EXAMPLE #20

The cordierite monolithic support whose cell density is 300 cells/6 mil and whose cell sectional shape is an almost regular quadrangle is used as the support for the exhaust gas purifying catalyst. The slurry solution for the HC adsorbent layer having the same composition as EXAMPLE #1 is coated on this support until its coating amount reaches 200 g/L after the burning. Other conditions are set to the same conditions as EXAMPLE #1, and the exhaust gas purifying catalyst is prepared.

The average thickness of the HC adsorbent layer (zeolite layer) in EXAMPLE #20 is 150 μm at the flat portion of the cell. The ratio Rc/Rf is about 1.1 and the ratio (X−Rc)/(Y−Rf) is about 9.1.

EXAMPLE #21

The cordierite monolithic support whose cell sectional shape is an almost regular hexagon is used as the support for the exhaust gas purifying catalyst. The cell density of this support is 400 cells/6 mil. The slurry solution for the HC adsorbent layer having the same composition as EXAMPLE #1 is coated on this support until its coating amount becomes 200 g/L after the burning. Other conditions are set to the same conditions as EXAMPLE #1, and the exhaust gas purifying catalyst is prepared.

The average thickness of the HC adsorbent layer (zeolite layer) in EXAMPLE #21 is 150 μm at the flat portion of the cell. The ratio Rc/Rf is about 1.1 and the ratio (X−Rc)/(Y−Rf) is about 1.7.

EXAMPLE #22

The slurry solution is prepared by introducing the Pd-impregnated alumina powder (powder I) of 530 g, the Pd-impregnated cerium oxide powder (powder II) of 235 g, the nitric acid alumina sol of 350 g, the barium carbonate of 130 g, the Rh-impregnated alumina powder (powder III) of 235 g, the zirconium oxide powder of 50 g containing 1 mol % La and 20 mol % Ce, and the nitric acid alumina sol of 150 g into a magnetic ball mill, and then crushing the mixture. Then, this slurry solution is coated on the above catalytic layer A. Other conditions are set to the same conditions as EXAMPLE #1, and the exhaust gas purifying catalyst is prepared.

The average thickness of the HC adsorbent layer (zeolite layer) in EXAMPLE #22 is 75 μm at the flat portion of the cell. The ratio Rc/Rf is about 1.3 and the ratio (X−Rc)/(Y−Rf) is about 19.7.

EXAMPLE #23

The slurry solution for the HC adsorbent layer is coated on the support to come up to 50 g/L after the burning. Other conditions are set to the same conditions as EXAMPLE #1, and the exhaust gas purifying catalyst is prepared.

The average thickness of the HC adsorbent layer (zeolite layer) in EXAMPLE #23 is 25 μm at the flat portion of the cell. The ratio Rc/Rf is about 1.7 and the ratio (X−Rc)/(Y−Rf) is about 57.6.

EXAMPLE #24

The cordierite monolithic support whose cell density is 200 cells/10 mil and whose cell sectional shape is an almost regular quadrangle is used as the support for the exhaust gas purifying catalyst. The slurry for the HC adsorbent layer is coated on this support until its coating amount reaches 50 g/L after the burning. Other conditions are set to the same conditions as EXAMPLE #1, and the exhaust gas purifying catalyst is prepared.

The average thickness of the HC adsorbent layer (zeolite layer) in EXAMPLE #24 is 25 μm at the flat portion of the cell. The ratio Rc/Rf is about 1.3 and the ratio (X−Rc)/(Y−Rf) is about 13.7.

EXAMPLE #25

The cordierite monolithic support whose cell density is 300 cells/6 mil and whose cell sectional shape is an almost regular quadrangle is used as the support for the exhaust gas purifying catalyst. The slurry for the HC adsorbent layer is coated on this support until its coating amount reaches 50 g/L after the burning. Other conditions are set to the same conditions as EXAMPLE #1, and the exhaust gas purifying catalyst is prepared.

The average thickness of the HC adsorbent layer (zeolite layer) in EXAMPLE #25 is 25 μm at the flat portion of the cell. The ratio Rc/Rf is about 1.4 and the ratio (X−Rc)/(Y−Rf) is about 10.1.

EXAMPLE #26

The cordierite monolithic support whose cell density is 400 cells/6 mil and whose cell sectional shape is an almost regular hexagon is used as the support for the exhaust gas purifying catalyst. The slurry for the HC adsorbent layer is coated on this support until its coating amount reaches 50 g/L after the burning. Other conditions are set to the same conditions as EXAMPLE #1, and the exhaust gas purifying catalyst is prepared.

The average thickness of the HC adsorbent layer (zeolite layer) in EXAMPLE #26 is 25 μm at the flat portion of the cell. The ratio Rc/Rf is about 1.1 and the ratio (X−Rc)/(Y−Rf) is about 4.1.

EXAMPLE #27

Merely the A-type zeolite is used as the zeolite for the HC adsorbent layer. Other conditions are set to the same conditions as EXAMPLE #1, and the exhaust gas purifying catalyst is prepared.

The average thickness of the HC adsorbent layer (zeolite layer) in EXAMPLE #27 is 75 μm at the flat portion of the cell. The ratio Rc/Rf is about 1.5 and the ratio (X–Rc)/(Y–Rf) is about 20.5.

EXAMPLE #28

Merely the USY-type zeolite is used as the zeolite for the HC adsorbent layer. Other conditions are set to the same conditions as EXAMPLE #1, and the exhaust gas purifying catalyst is prepared.

The average thickness of the HC adsorbent layer (zeolite layer) in EXAMPLE #28 is 75 μm at the flat portion of the cell. The ratio Rc/Rf is about 1.5 and the ratio (X–Rc)/(Y–Rf) is about 20.5.

EXAMPLE #29

Merely the MFI-type zeolite is used as the zeolite for the HC adsorbent layer. Other conditions are set to the same conditions as EXAMPLE #1, and the exhaust gas purifying catalyst is prepared.

The average thickness of the HC adsorbent layer (zeolite layer) in EXAMPLE #29 is 75 μm at the flat portion of the cell. The ratio Rc/Rf is about 1.5 and the ratio (X–Rc)/(Y–Rf) is about 20.5.

EXAMPLE #30

Ba is not contained in the metal-based catalyst layer. Other conditions are set to the same conditions as EXAMPLE #1, and the exhaust gas purifying catalyst is prepared.

The average thickness of the HC adsorbent layer (zeolite layer) in EXAMPLE #30 is 75 μm at the flat portion of the cell. The ratio Rc/Rf is about 1.5 and the ratio (X–Rc)/(Y–Rf) is about 20.5.

EXAMPLE #31

Ba is contained in the metal-based catalyst layer by 50 g/L. Other conditions are set to the same conditions as EXAMPLE #1, and the exhaust gas purifying catalyst is prepared.

The average thickness of the HC adsorbent layer (zeolite layer) in EXAMPLE #31 is 75 μm at the flat portion of the cell. The ratio Rc/Rf is about 1.5 and the ratio (X–Rc)/(Y–Rf) is about 20.5.

Respective conditions of above EXAMPLEs #1 to #31 are shown in table 1 of FIG. 5 and table 2 of FIG. 6. The HC purifying characteristics (at A-bag of LA-4) of respective EXAMPLEs are evaluated under following conditions. These results are shown in table 3 of FIG. 7.

Figure 4:
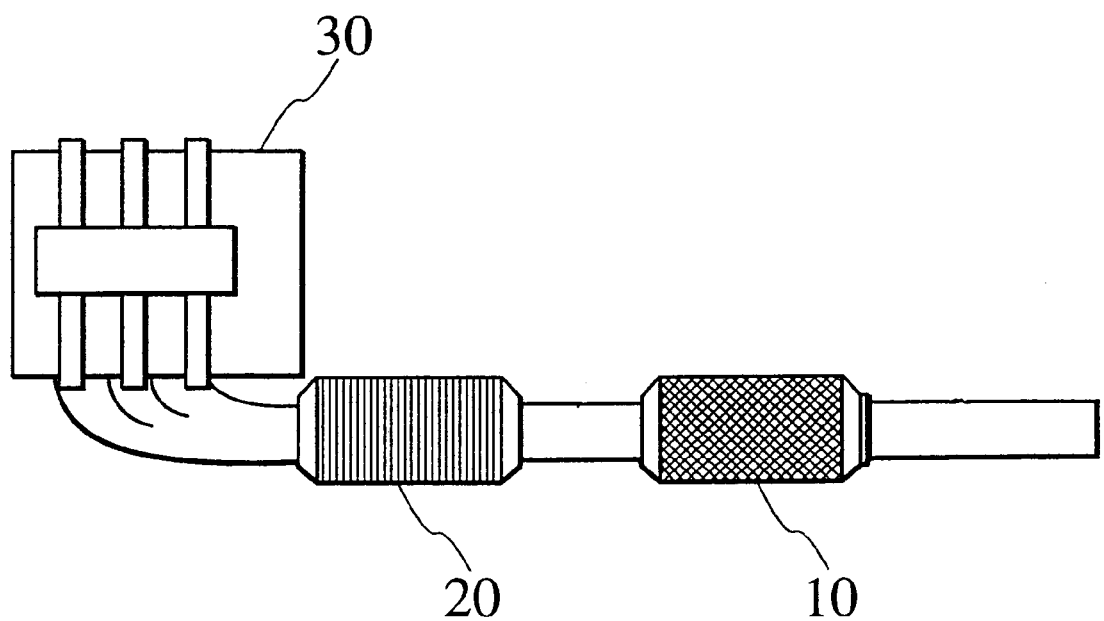
FIG. 4 is a view showing a configuration of an engine exhaust system employed to evaluate the exhaust gas purifying catalyst according to the present invention.

FIG. 4 shows a configuration of an engine exhaust system employed to evaluate the exhaust gas purifying catalyst according to the present invention. The normal three-way catalyst 20 is arranged on the downstream side of the exhaust gas from the engine 30, and the catalyst 10 of the present embodiment is arranged on the downstream side of the three-way catalyst 20.

The conditions for the HC purifying characteristic evaluation will be given in the following. In this case, the "zeolite average thickness in the cellflat portion" in FIG. 6 indicates an average value of "Y–Rf" in the catalytic layer structures shown in FIG. 3A to FIG. 3C.

[Endurance Conditions]
  Engine exhaust amount: 3000 cc
  Fuel gasoline: Nisseki dash gasoline
  Catalyst inlet gas temperature: 650° C.
  Test period: 100 hours
[Performance Evaluation Conditions]
  Catalyst capacity for one bank: three-way catalyst (catalyst 20) 1.3 liter+catalyst of the present invention (catalyst 10) 2.6 liter
  Test vehicle: in-line 4 cylinder 2.0 liter engine manufactured by Nissan Motor Co. Ltd.
  Carbon number of the hydrocarbons discharged in the engine start-up (contained in the catalyst inlet gas)
    C2–C3 21.0%
    C4–C6 33.0%
    C7–C9 40.0%

From the table 3 of FIG. 7, it can be understood that the catalysts prepared by EXAMPLEs #1 to #22 have high catalytic activity and are superior in the HC purification efficiency, especially the cold HC purification efficiency. In particular, according to the catalyst in EXAMPLE #19, the best HC purification characteristic can be achieved.

More particularly, the catalysts prepared by EXAMPLEs #1 to #22 are controlled such that a volume occupying rate of the zeolite layer in which the zeolite thickness in the cell flat portion is in excess of 50 μm exceeds 50%. Thus, it can be understood that the optimization of the zeolite layer and the metal-based layer can be achieved according to such coating layer structure and also HC adsorption/ desorption/ purification cycles can be effectively accomplished.

According to the comparison between EXAMPLE #1 and EXAMPLE #23, it can be understood that, in the case that the catalytic support employs the cells which have the triangle sectional shape, the better optimization of the structure of the zeolite layer and the metal-based catalyst layer can be achieved and also the better HC purification characteristic can be exhibited when the value of Rc/Rf is not 1.7 but 1.5 or the value of (X–Rc)/(Y–Rf) is not 57.6 but 20.5.

According to the comparison between EXAMPLE #20 and EXAMPLE #25, it can be understood that, in the case that the catalytic support employs the cells which have the quadrangle sectional shape, the better optimization of the structure of the zeolite layer and the metal-based catalyst layer can be achieved and also the better HC purification characteristic can be exhibited when the value of Rc/Rf is not 1.4 but 1.1.

According to the comparison between EXAMPLE #19 and EXAMPLE #24, it can be understood that, in the case that the catalytic support employs the cells which have the quadrangle sectional shape, the better optimization of the structure of the zeolite layer and the metal-based catalyst layer can be achieved and also the better HC purification characteristic can be exhibited when the value of (X–Rc)/(Y–Rf) is less than 10.

In addition, in EXAMPLEs, there is employed the coating layer structure such that either the Pd and Rh coexisting layer is formed on the zeolite layer or the Pd layer is formed on the zeolite layer and then the Rh layer is formed thereon and then Pt can be added to any one layer or both layers.

According to such coating layer structure, HC desorbed at the low temperature can be purified effectively and also HC, CO and NOx can be purified with good balance even when the exhaust gases which is shifted slightly richer than the stoichometric air-fuel ratio are exhausted. Further, poisoning resistant property can be improved by adding Pt.

According to the comparison between EXAMPLEs #27, #28, #29 and remaining EXAMPLEs, it can be understood that, in order to adsorb effectively HC in the exhaust gases, it is more preferable to employ the β-zeolite as the zeolite for the HC adsorbent layer. Moreover, as can be seen from the results in EXAMPLE #1 to EXAMPLE #7, it can be understood that the HC adsorbing ability can be increased much more by adding various zeolites into the β-zeolite as the zeolite of the HC adsorbent layer.

According to the comparison between EXAMPLE #1 and EXAMPLE #30, it can be understood that the purification efficiency of the metal-based catalyst layer can be improved by adding the alkaline metal such as Ba, etc. into the metal-based catalyst layer.

The entire contents of Japanese Patent Applications Hei 11-201475 (filed Jul. 15, 1999), P2000-210589 (filed Jul. 11, 2000) and U.S. Pat. No. 6,047,544 are incorporated herein by reference.

Although the inventions have been described above by reference to certain embodiments of the invention, the inventions are not limited to the embodiments described above. Modifications and variations of the embodiments described above will occur to those skilled in the art in light of the above teaching.

What is claimed is:

1. An exhaust gas purifying catalyst, comprising:
    a monolithic support including a plurality of cells whose sectional shape is a substantially regular N-polygon, wherein N is a natural number of more than or equal to 3;
    a hydrocarbon adsorbent layer being formed on the cells of the monolithic support and containing zeolite as a main component, a ratio Rc/Rf in a cell sectional shape being set to Rc/Rf≦1.7,
    where Rc is a distance from a center of gravity to an inner wall surface of the hydrocarbon adsorbent layer along a line extending from the center of gravity of the regular N-polygon in the cell sectional shape to a corner of the N-polygon, and Rf is a distance from the center of gravity to the inner wall surface of the hydrocarbon adsorbent layer along a line extending from the center of gravity perpendicularly to respective sides of the regular N-polygon;
    a metal-based catalyst layer being formed on the hydrocarbon adsorbent layer and containing at least one noble metal selected from the group consisting of platinum, palladium, and rhodium.

2. The exhaust gas purifying catalyst of claim 1, wherein the N-polygon is a regular triangle, wherein N=3, and a ratio Rc/Rf of the distance Rc to the distance Rf is set to Rc/Rf≦1.6.

3. The exhaust gas purifying catalyst of claim 2, wherein an area ratio S3/Sf of an area S3 of the regular triangle to an area Sf of a circle with the distance Rf as a radius and with the center of gravity for a center is set to S3/Sf≧1.67.

4. The exhaust gas purifying catalyst of claim 1, wherein the N-polygon is a regular quadrangle, wherein N=4, and a ratio Rc/Rf of the distance Rc to the distance Rf is set to Rc/Rf≦1.3.

5. The exhaust gas purifying catalyst of claim 4, wherein an area ratio S4/Sf of an area S4 of the regular quadrangle to an area Sf of a circle with a radius Rf and with the center of gravity for its center is set to S4/Sf≧1.28.

6. The exhaust gas purifying catalyst of claim 1, wherein the regular N-polygon is a regular polygon, wherein N≧5, and a ratio Rc/Rf of the distance Rc to the distance Rf is set to Rc/Rf≦1.1.

7. The exhaust gas purifying catalyst of claim 6, wherein the regular N-polygon is a regular polygon, wherein N≧5, and an area ratio SN/Sf of an area SN of the regular polygon to an area Sf of a circle with a radius Rf and with the center of gravity for its center is set to SN/Sf≧1.1.

8. The exhaust gas purifying catalyst of claim 1, wherein a volume of the hydrocarbon adsorbent layer which satisfies a difference (Y−Rf)≧35 μm (where Y is a shortest distance) from the center of gravity of the regular N-polygon to a cell side and Rf is the distance occupies more than or equal to 50 volume % of an overall volume of the hydrocarbon adsorbent layer in the monolithic support.

9. The exhaust gas purifying catalyst of claim 1, wherein zeolite of the hydrocarbon adsorbent layer contains H-type β-zeolite whose Si/Al ratio is 10 to 500.

10. The exhaust gas purifying catalyst of claim 9, wherein zeolite of the hydrocarbon adsorbent layer contains at least one member selected from the group consisting of MFI-zeolite, Y- zeolite, USY- zeolite, mordenite, ferrierite, A-zeolite, X- zeolite, $AlPO_4$, and SAPO.

11. The exhaust gas purifying catalyst of claim 1, wherein the hydrocarbon adsorbent layer contains at least one element selected from the group consisting of lead, magnesium, calcium, strontium, barium, silver, yttrium, lanthanum, cerium, neodymium, phosphorus, boron, and zirconium.

12. The exhaust gas purifying catalyst of claim 1, wherein the hydrocarbon adsorbent layer contains,
    at least one noble metal selected from the group consisting of cerium, neodymium, and palladium,
    a zirconium oxide containing at least one element selected from the group consisting of cerium, neodymium, and lanthanum by 1 to 40 mol % in terms of metal, and
    alumina.

13. The exhaust gas purifying catalyst of claim 1, wherein the metal-based catalyst layer contains,
    alumina containing at least one element selected from the group consisting of cerium, zirconium, and lanthanum by 1 to 40 mol % in terms of metal, and
    cerium oxide containing at least one element selected from the group consisting of zirconium, neodymium, and lanthanum by 1 to 40 mol % in terms of metal.

14. The exhaust gas purifying catalyst of claim 1, wherein the metal-based catalyst layer contains an alkaline metal and/or an alkaline earth metal.

15. The exhaust gas purifying catalyst of claim 1, further comprising: another metal-based catalyst layer being formed on the metal-based catalyst layer and containing at least one noble metal selected from the group consisting of platinum, palladium, and rhodium, and a zirconium oxide containing at least one element selected from the group consisting of cerium, zirconium, and lanthanum by 1 to 40 mol % in terms of metal.

16. An exhaust gas purifying catalyst comprising:
    a monolithic support having a plurality of cells whose sectional shape is a substantally regular N-polygon, wherein N is a natural number of more than or equal to 3;
    a hydrocarbon adsorbent layer being formed on the monolithic support and containing zeolite as a main component; and
    a metal-based catalyst layer being formed on the hydrocarbon adsorbent layer and containing at least one noble metal selected from the group consisting of platinum, palladium, and rhodium;

wherein each cell sectional structure satisfies the following $$1 \leq (X-Rc)/(Y-Rf) < 40,$$

where X is a distance from a center of gravity of the regular N-polygon to corners of the regular N-polygon, Y is a shortest distance from the center of gravity to cell sides of the regular N-polygon, Rc is a distance from a center of gravity to an inner wall surface of the hydrocarbon adsorbent layer along a line extending from the center of gravity of the regular N-polygon in the cell sectional shape to a corner of the N-polygon, and Rf is a distance from the center of gravity to the inner wall surface of the hydrocarbon adsorbent layer along a line extending from the center of gravity perpendicularly to respective sides of the regular N-polygon.

17. The exhaust gas purifying catalyst of claim 16 wherein the regular N-polygon is a regular triangle, wherein N=3, and each cell sectional structure satisfies the following $$1 \leq (X-Rc/Y-Rf) < 25.$$

18. The exhaust gas purifying catalyst of claim 16, wherein the regular N-polygon is a regular quadrangle, wherein N=4, and each cell sectional structure satisfies the following $$1 \leq (X-Rc)/(Y-Rf) < 10.$$

19. The exhaust gas purifying catalyst of claim 16, wherein the regular N-polygon is a regular polygon, wherein N≧5, and each cell sectional structure satisfies the following $$1 \leq (X-Rc)/(Y-Rf) < 2.$$

* * * * *